United States Patent
Fujii

(10) Patent No.: US 11,520,872 B2
(45) Date of Patent: Dec. 6, 2022

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Takashi Fujii, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 16/562,686

(22) Filed: Sep. 6, 2019

(65) Prior Publication Data

US 2020/0082067 A1   Mar. 12, 2020

(30) Foreign Application Priority Data

Sep. 11, 2018  (JP) .............................. JP2018-169975

(51) Int. Cl.
  *H04L 29/06*  (2006.01)
  *G06F 21/44*  (2013.01)
  *G06F 21/62*  (2013.01)

(52) U.S. Cl.
  CPC .......... *G06F 21/44* (2013.01); *G06F 21/6218* (2013.01)

(58) Field of Classification Search
  CPC ......... G06F 21/575; G06F 21/44; G06F 21/57
  See application file for complete search history.

(56) References Cited

U.S. PATENT DOCUMENTS

| 2007/0113088 A1* | 5/2007 | Volp | G06F 9/4405 713/169 |
| 2008/0025503 A1* | 1/2008 | Choi | H04L 9/3226 380/30 |
| 2014/0052975 A1* | 2/2014 | Rodgers | G06F 21/602 713/2 |
| 2014/0059338 A1* | 2/2014 | Snoussi | G06F 9/4401 713/2 |

FOREIGN PATENT DOCUMENTS

| JP | 2013-114620 A | 6/2013 |
| JP | 2014021953 A * | 2/2014 |
| JP | 2014021953 A | 2/2014 |
| JP | 2014-056390 A | 3/2014 |

OTHER PUBLICATIONS

Japanese Office Action dated May 30, 2022 in counterpart Japanese Patent Appln. No. 2018-169975.

* cited by examiner

Primary Examiner — Jason K Gee
(74) Attorney, Agent, or Firm — Venable LLP

(57) ABSTRACT

An information processing apparatus includes a first processor, a second processor, and one or more non-volatile storage devices. The one or more storage devices store a first control program to be executed by the first processor and a second control program to be executed by the second processor. The first processor verifies the second control program stored in the one or more storage devices, and then verifies the first control program stored in the one or more storage devices.

11 Claims, 4 Drawing Sheets

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to an information processing apparatus, a method for controlling the information processing apparatus, and a storage medium.

Description of the Related Art

In recent years, a mechanism (alteration detection function) of, at the time point when activation of a system is started, examining whether there is alteration in software included in the system and preventing possibly altered software from operating has been introduced into information processing apparatuses in more and more cases. Generally, there is a tendency that a system having such an alteration detection function takes more activation time of a system than a system without an alteration detection function, by a time length required to determine whether there is alteration.

Further, some information processing apparatuses, such as an image forming apparatus (image processing apparatus), include a controller including two CPUs, i.e., a main CPU and a sub-CPU (see Japanese Patent Laid-Open No. 2014-21953, for example). In such a configuration, generally, a main CPU and a sub-CPU handle different types of processing. For example, a sub-CPU handles control of devices, such as a scanner device and a printer device, and causes respective devices to execute scan or print processing. In this case, when an image forming apparatus is activated, preparation operation of the scanner device and the printer device is completed through the execution of negotiation with a sub-CPU after the sub-CPU is activated.

According to the alteration detection function described above, while alteration in firmware can be detected, activation time of the overall system of the image processing apparatus is increased. Increased activation time delays timing when negotiation between the sub-CPU and the printer device is started, which in turn delays time until preparation operation of the printer device is completed. As a result, noise and wasteful power consumption in the image processing apparatus occur. Further, a life of a printer engine may be shortened.

SUMMARY OF THE INVENTION

The present invention provides a technology of preventing a situation in which completion of preparation operation of a control target device controlled by a sub-CPU is delayed due to an alteration detection function, when an information processing apparatus including two CPUs is activated.

According to one aspect of the present invention, an information processing apparatus comprising: a first processor; a second processor; and one or more storage devices which are non-volatile storage devices and which store a first control program to be executed by the first processor and a second control program to be executed by the second processor, wherein the first processor verifies the second control program stored in the one or more storage devices, and then verifies the first control program stored in the one or more storage devices.

According to another aspect of the present invention, a method for controlling an information processing apparatus comprising: a first processor; a second processor; and one or more storage devices which are non-volatile storage devices and which store a first control program to be executed by the first processor and a second control program to be executed by the second processor, the method comprising: the first processor verifying the second control program stored in the one or more storage devices, and after verification of the second control program, the first processor verifying the first control program stored in the one or more storage devices.

According to still another aspect of the present invention, a non-transitory computer-readable storage medium storing a computer program for causing a computer to execute a method for controlling an information processing apparatus comprising: a first processor; a second processor; and one or more storage devices which are non-volatile storage devices and which store a first control program to be executed by the first processor and a second control program to be executed by the second processor, the method comprising: the first processor verifying the second control program stored in the one or more storage devices, and after verification of the second control program, the first processor verifying the first control program stored in the one or more storage devices.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Configuration of Image Processing Apparatus>

Figure 1:
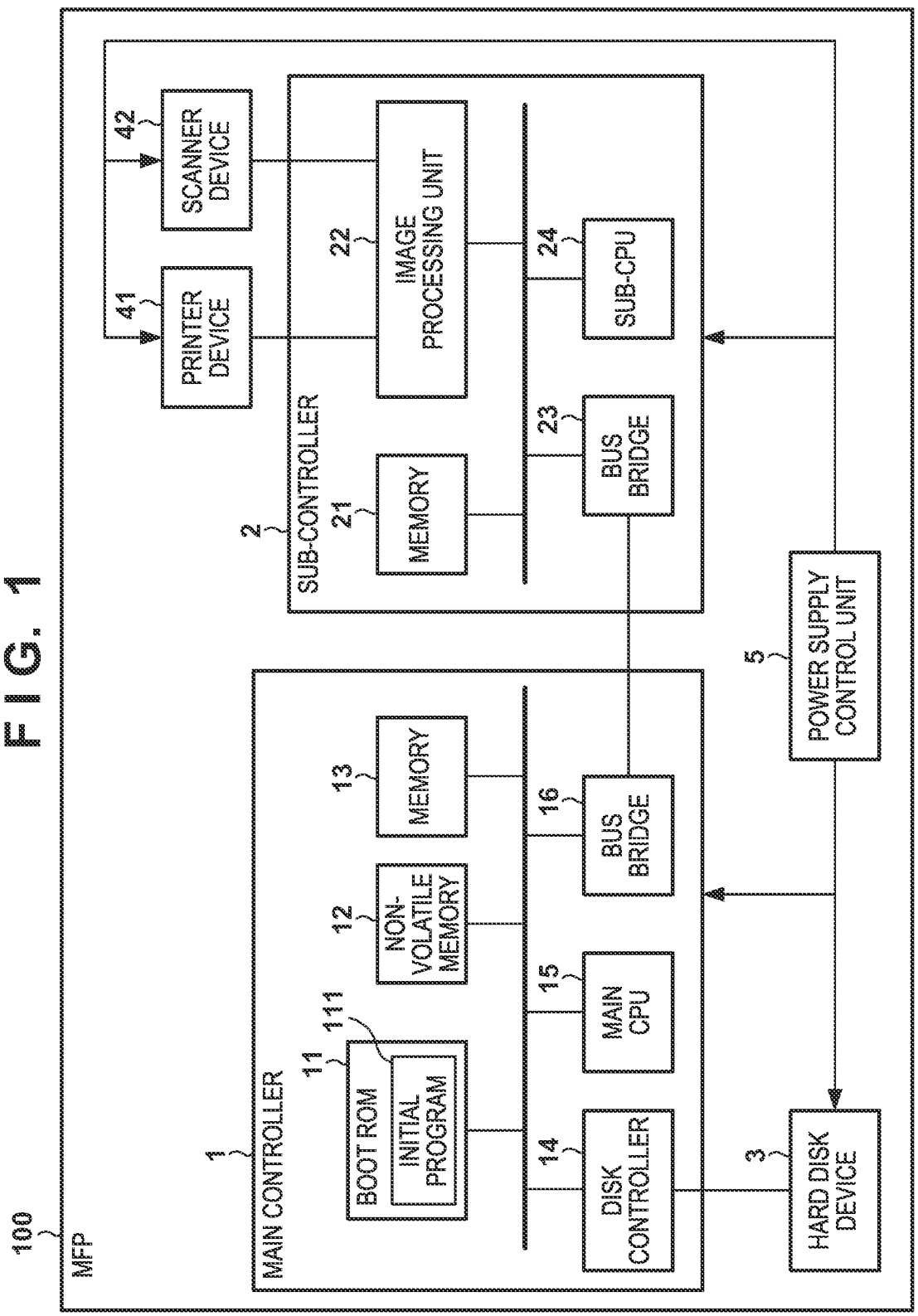
FIG. 1 is a block diagram illustrating a hardware configuration example of an MFP.

FIG. 1 is a block diagram illustrating a hardware configuration example of a multi-function peripheral (MFP), which is an image processing apparatus according to an embodiment of the present invention. The present embodiment describes an example in which the present invention is applied to an MFP, which is an image processing apparatus that includes a main CPU (first CPU) and a sub-CPU (second CPU) and performs image processing, as an example of the information processing apparatus. Note that the present invention can be applied to an information processing apparatus including a main CPU and a sub-CPU, and can also be applied to a print apparatus, a reading apparatus, a copying machine, and a facsimile apparatus, for example.

As illustrated in FIG. 1, an MFP 100 according to the present embodiment includes a main controller 1, a sub-controller 2, a hard disk device 3, a power supply control unit 5, a printer device 41, and a scanner device 42. The main controller 1 is constituted by what is called a general-purpose Central Processing Unit (CPU) system. The main controller 1 includes a main CPU 15, a boot Read Only Memory (ROM) 11, a non-volatile memory 12, a memory 13, a disk controller 14, and a bus bridge 16.

The main CPU 15 controls the overall main controller 1. The boot ROM 11 stores an initial program 111. The initial program 111 is executed by the main CPU 15 when the MFP 100 is activated. The non-volatile memory 12 is a non-volatile storage device that can maintain its storage contents even when the non-volatile memory 12 is not supplied with power from a power supply. The memory 13 is a volatile memory associated with the main CPU 15, and is used as a working area for the main CPU 15. To the main controller 1, the hard disk device 3 is connected. The hard disk device 3 is connected to the disk controller 14.

The sub-controller 2 is constituted by a general-purpose CPU system provided on a smaller scale than the main controller 1, and image processing hardware. The sub-controller 2 includes a sub-CPU 24, a memory 21, an image processing unit 22, and a bus bridge 23. Note that the main controller 1 and the sub-controller 2 are connected to each other through the bus bridge 16 and the bus bridge 23.

The sub-CPU 24 controls the overall sub-controller 2. The memory 21 is a volatile memory associated with the sub-CPU 24, and is used as a working area for the sub-CPU 24. To the sub-controller 2, the printer device 41 and the scanner device 42 are connected. The printer device 41 and the scanner device 42 are connected to the image processing unit 22. In the present embodiment, the sub-CPU 24 controls the printer device 41 and the scanner device 42 as control target devices.

The hard disk device 3 stores various data such as image data, and various control programs. The printer device 41 prints (outputs) an image on a sheet, based on image data output from the sub-controller 2. Note that the sheet may be referred to as a piece of printing paper, a printing medium, a recording medium, a piece of paper, a transfer medium, or a piece of transfer paper, for example. The scanner device 42 optically reads an image from a document, converts the image into a digital image, and outputs the converted digital image to the sub-controller 2 as image data. The power supply control unit 5 supplies power to each device illustrated in FIG. 1, and controls a power state of the MFP 100.

Note that, in the present embodiment, the main CPU 15 serves as an example of a first processor, and the sub-CPU 24 serves as an example of a second processor.

<Programs in Non-Volatile Memory>

Figure 2:
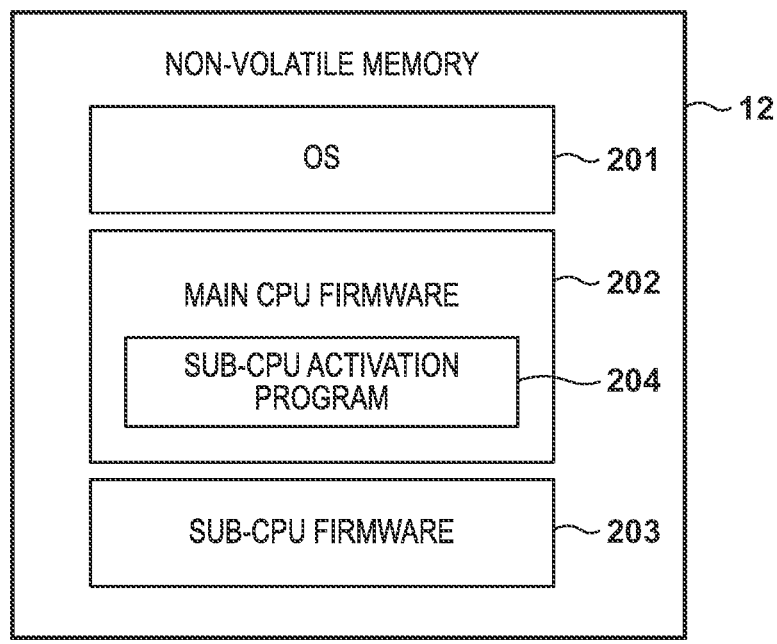
FIG. 2 is a diagram illustrating an example of programs stored in a non-volatile memory.

FIG. 2 is a diagram schematically illustrating programs stored in the non-volatile memory 12. The non-volatile memory 12 stores programs such as an Operating System (OS) 201, main CPU firmware 202, and sub-CPU firmware 203. The main CPU firmware 202 includes a sub-CPU activation program 204. In other words, the sub-CPU activation program 204 is stored in the non-volatile memory 12, as a part of the main CPU firmware 202.

The main CPU firmware 202 is a control program to be executed by the main CPU 15. The sub-CPU firmware 203 is a control program to be executed by the sub-CPU 24. The sub-CPU activation program 204 is a program for activating the sub-CPU 24 by transferring the sub-CPU firmware 203, whose validity has been confirmed through verification processing to be described later, to the memory 21, and then releasing a reset status of the sub-CPU 24. Note that each program described above is provided with electronic signature information derived in advance. The electronic signature information is used to verify (confirm) validity of a program (i.e., a state that a program is valid) in verification processing to be described later.

As described above, the non-volatile memory 12 stores the main CPU firmware 202 to be executed by the main CPU 15, the sub-CPU firmware 203 to be executed by the sub-CPU 24, and the sub-CPU activation program for activating the sub-CPU 24. In the present embodiment, the main CPU firmware 202 serves as an example of a first control program, and the sub-CPU firmware 203 serves as an example of a second control program.

<Activation Processing of MFP>

Figure 3:
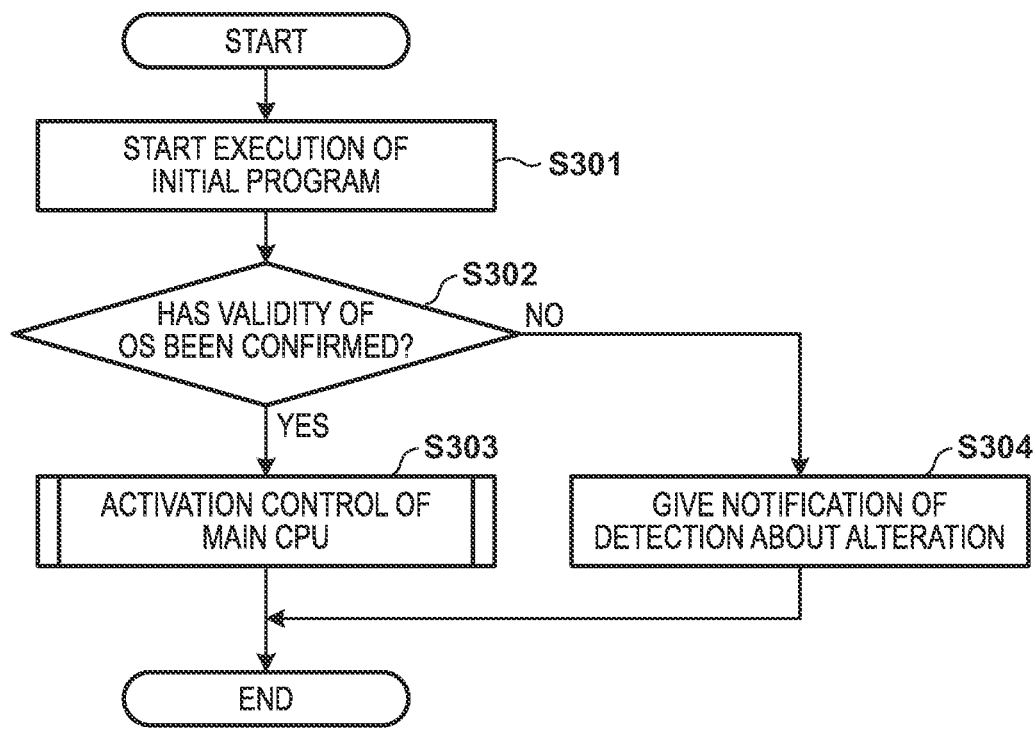
FIG. 3 is a flowchart illustrating a procedure of activation processing of the MFP.
Figure 4:
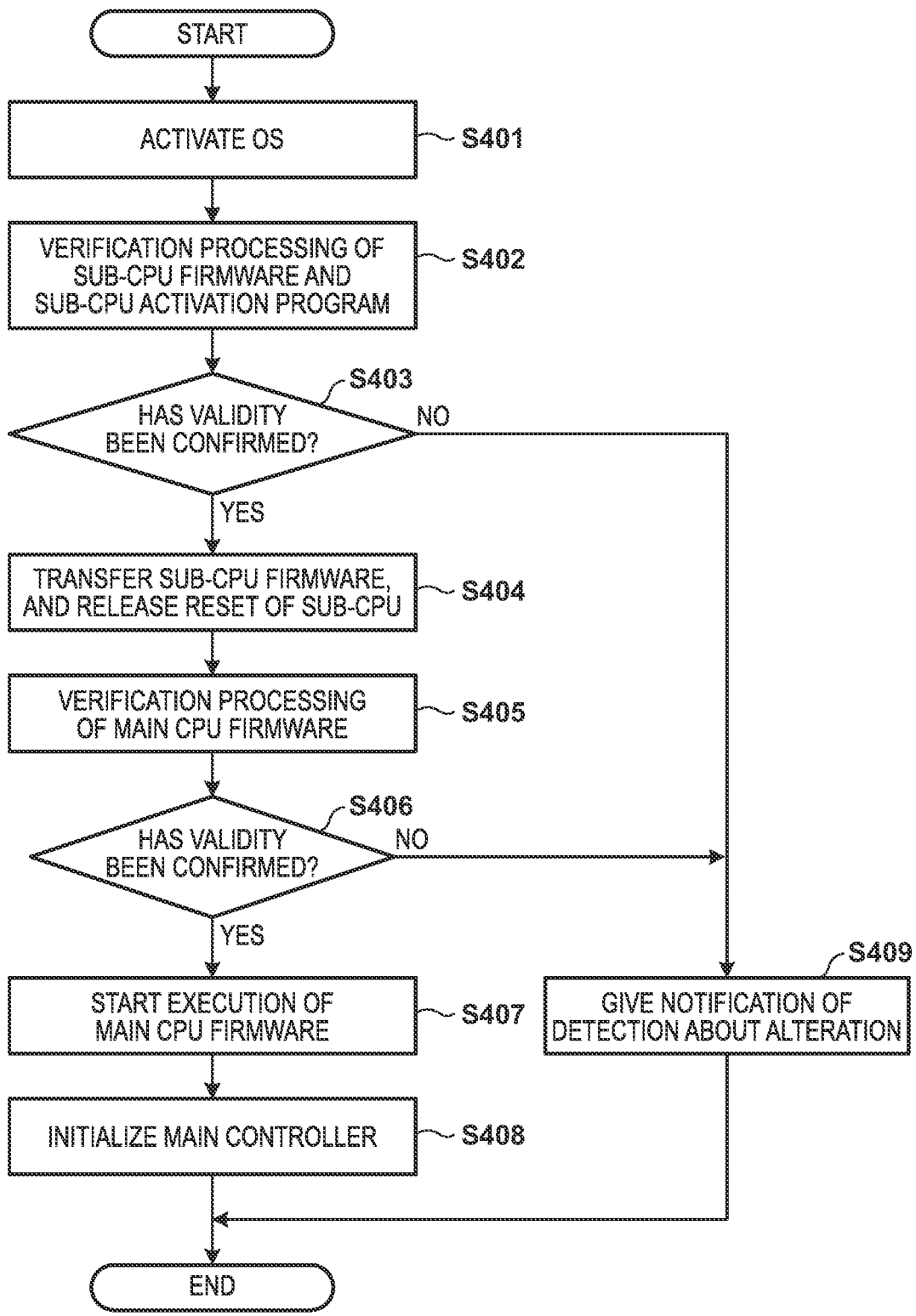
FIG. 4 is a flowchart illustrating a procedure of activation control of a main CPU.

FIG. 3 is a flowchart illustrating a procedure of activation processing of the MFP 100. Note that the verification processing to be described with reference to FIG. 3 and FIG. 4 is implemented through processing in which signature verification processing using a public key is performed on electronic signature information provided to a verification target program, for example, but may be implemented by using another method. Further, in the present embodiment, as methods of verification processing, the same method is used for verification processing of each program, but different methods may be used for verification processing of different programs.

If the MFP 100 is activated, in step S301, the main CPU 15 starts execution of the initial program 111 stored in the boot ROM 11. The initial program 111 is a program for performing verification processing for confirming validity of the OS 201 stored in the non-volatile memory 12, and for activating the OS 201. The main CPU 15 executes verification processing of the OS 201, based on execution of the initial program 111. In step S302, the main CPU 15 determines whether or not validity of the OS 201 (i.e., a state that the OS 201 is valid) has been confirmed. If validity of the OS 201 is confirmed (i.e., the OS 201 is valid), the main CPU 15 causes the processing to proceed to step S303. If validity is not confirmed (i.e., the OS 201 is not valid), the main CPU 15 causes the processing to proceed to step S304.

If validity of the OS 201 is confirmed, in step S303, the main CPU 15 performs activation control of the main CPU 15, in accordance with the procedure illustrated in FIG. 4 to be described later. In the activation control, the main CPU 15 reads the OS 201 from the non-volatile memory 12 and activates the read OS 201, to thereby execute processing of the OS 201. Specifically, the main CPU 15 performs verification processing of each piece of firmware (the main CPU firmware 202, the sub-CPU activation program 204, and the sub-CPU firmware 203) stored in the non-volatile memory 12. If validity of each piece of firmware is confirmed, the main CPU 15 performs processing for starting activation of each piece of firmware. When activation of each piece of firmware is completed, the main CPU 15 terminates the processing of the procedure of FIG. 3.

On the other hand, if validity of the OS 201 is not confirmed, in step S304, the main CPU 15 gives notification about detection of alteration in the OS 201. For example, the main CPU 15 gives an error notification about activation failure on an operation unit (display unit) of the MFP 100, and stops activation of the MFP 100. In this manner, the main CPU 15 terminates the processing of the procedure of FIG. 3.

<Activation Control of Main CPU>

FIG. 4 is a flowchart illustrating a procedure of activation control of the main CPU 15. First, in step S401, the main CPU 15 activates the OS 201. If the OS 201 is activated, in step S402, the main CPU 15 performs verification processing of the sub-CPU firmware 203 and the sub-CPU activation program 204 stored in the non-volatile memory 12. Through the verification processing, the main CPU 15 determines whether there is alteration in the sub-CPU firmware 203 and the sub-CPU activation program 204. In step S403, the main CPU 15 determines whether validity of the sub-CPU firmware 203 and the sub-CPU activation program 204 has been confirmed, based on a result of the verification processing of step S402. If validity is confirmed, the main CPU 15 causes the processing to proceed to step S404. If validity is not confirmed, the main CPU 15 causes the processing to proceed to step S409.

If the main CPU 15 determines that the sub-CPU firmware 203 and the sub-CPU activation program 204 are valid, in step S404, the main CPU 15 executes the sub-CPU activation program 204. The main CPU 15 executes the sub-CPU activation program 204, to thereby transfer the sub-CPU firmware 203 to the sub-controller 2, and release a reset status of the sub-CPU 24. In other words, the main CPU 15 transfers the sub-CPU firmware 203 to the sub-controller 2 via the bus bridge 16, and loads the transferred sub-CPU firmware 203 in a predetermined storage area of the memory 21. Further, the main CPU 15 releases a reset status of the sub-CPU 24, to thereby activate the sub-CPU 24. As a result, the sub-CPU 24 starts execution of processing of the procedure of FIG. 5 to be described later (activation control of the sub-CPU 24).

If the processing of step S404 is completed, in step S405, the main CPU 15 performs verification processing of the main CPU firmware 202 stored in the non-volatile memory 12. Through the verification processing, the main CPU 15 determines whether there is alteration in the main CPU firmware 202. In step S406, the main CPU 15 determines whether validity of the main CPU firmware 202 has been confirmed, based on a result of the verification processing of step S405. If validity is confirmed, the main CPU 15 causes the processing to proceed to step S407. If validity is not confirmed, the main CPU 15 causes the processing to proceed to step S409.

If the main CPU 15 confirms that the main CPU firmware 202 is valid, in step S407, the main CPU 15 starts execution of the main CPU firmware 202. The main CPU firmware 202 is loaded in a predetermined storage area of the memory 13, and execution of the main CPU firmware 202 is started. If the main CPU 15 executes the main CPU firmware 202, in step S408, initialization of each device in the main controller 1 is executed. Through the processing above, the main CPU 15 terminates the processing of step S303.

On the other hand, if validity of any of the main CPU firmware 202, the sub-CPU firmware 203, and the sub-CPU activation program 204 is not confirmed, in step S409, the main CPU 15 gives notification about detection of alteration in a program. For example, the main CPU 15 gives an error notification about activation failure on an operation unit (display unit) of the MFP 100, and stops activation of the MFP 100. In this manner, the main CPU 15 terminates the processing of the procedures of FIG. 3 and FIG. 4.

<Activation Control of Sub-CPU>

Figure 5:
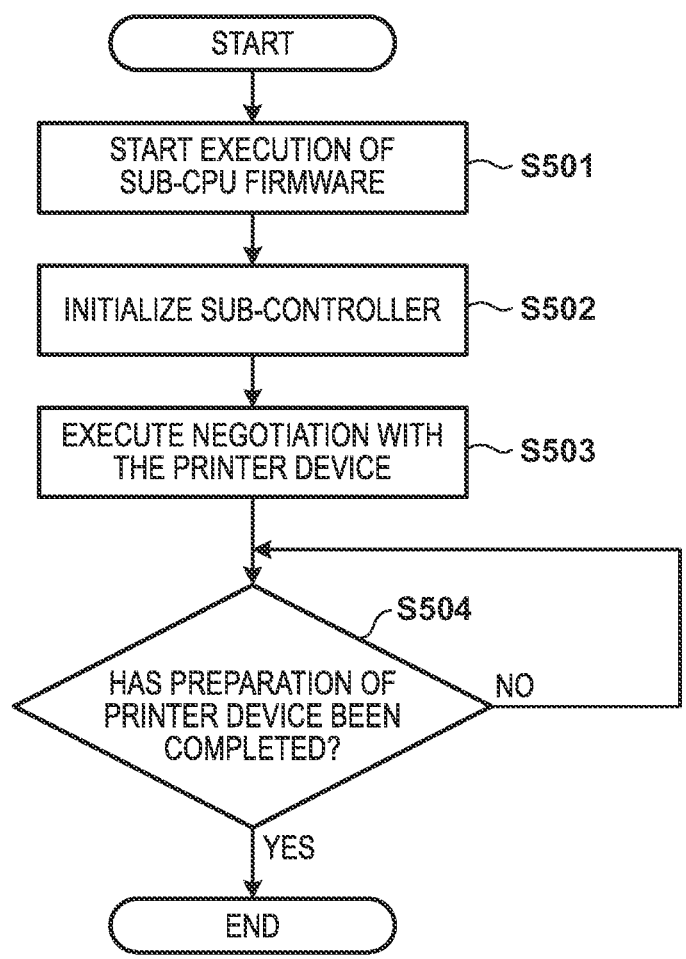
FIG. 5 is a flowchart illustrating a procedure of activation control of a sub-CPU.

FIG. 5 is a flowchart illustrating a procedure of activation control of the sub-CPU 24. If a reset status of the sub-CPU 24 is released through the processing of step S404, the sub-CPU 24 starts processing of the procedure of FIG. 5. Note that the present embodiment is described by using, as an example, the printer device 41 as an execution target of negotiation to be described later, but the scanner device 42 may be an execution target of negotiation. Further, negotiation of the printer device 41 and negotiation of the scanner device 42 may be executed at the same time, or may be executed sequentially.

First, in step S501, if a reset status of the sub-CPU 24 is released by the main CPU 15, the sub-CPU 24 starts execution of the sub-CPU firmware 203 stored in the memory 21. Next, in step S502, the sub-CPU 24 performs initialization of each device in the sub-controller 2. If initialization of each device is completed, in step S503, the sub-CPU 24 executes negotiation with the printer device 41 via the image processing unit 22. In this manner, if the sub-CPU 24 is activated by the main CPU 15, the sub-CPU 24 starts execution of the sub-CPU firmware 203 to cause a control target device (the printer device 41) to start preparation operation.

Then, in step S504, the sub-CPU 24 determines whether or not preparation of the printer device 41 (i.e., preparation such that a job can be executed) has been completed. After execution of the negotiation in step S503, the printer device 41 executes various adjustment operations. Therefore, completion of the execution of the adjustment operation needs to be waited for, such that a job can be executed. The sub-CPU 24 confirms whether or not preparation of the printer device 41 has been completed via the image processing unit 22, and repeats the determination processing of step S504 until the preparation is completed. If preparation of the printer device 41 is completed, the sub-CPU 24 terminates the processing of the procedure of FIG. 5.

As described in the above, in the MFP 100 according to the present embodiment, when the MFP 100 is activated, the main CPU 15 verifies validity of the sub-CPU firmware (second control program) and the sub-CPU activation program stored in the non-volatile memory 12. The main CPU 15 further executes the sub-CPU activation program to activate the sub-CPU 24, and then the main CPU 15 verifies validity of the main CPU firmware (first control program) stored in the non-volatile memory 12.

In this manner, the main CPU 15 verifies validity of the sub-CPU firmware and the sub-CPU activation program prior to verifying validity of the main CPU firmware, so that the sub-CPU 24 is activated first. In this manner, the sub-CPU 24 can, without waiting for completion of verification of validity of the main CPU firmware, start execution of the sub-CPU firmware and cause a control target device (the printer device 41 and the scanner device 42) to start preparation operation. In other words, start of preparation operation of a device is not unnecessarily waited for due to an alteration detection function until verification of validity of the main CPU firm is completed. Therefore, according to the present embodiment, a situation in which completion of preparation operation of a control target device controlled by the sub-CPU 24 is delayed due to an alteration detection function when the MFP 100 is activated can be prevented.

Note that the embodiment described above can also be applied to a case where validity of the sub-CPU firmware or the sub-CPU activation program is not verified. For example, in a case where the sub-CPU firmware or the sub-CPU activation program is stored in a one-time memory area (OTP area) in which a program can be written only once, verification processing of a program stored in that memory area need not be performed.

Specifically, in a case where verification processing of the sub-CPU activation program is not performed, in step S402, the main CPU 15 performs verification processing of the sub-CPU firmware prior to verifying validity of the main CPU firmware. In contrast, in a case where verification processing of the sub-CPU firmware is not performed, in step S402, the main CPU 15 performs verification processing of the sub-CPU activation program prior to verifying validity of the main CPU firmware. Further, the main CPU 15 executes the sub-CPU activation program to activate the sub-CPU 24 (step S404), and then verifies validity of the main CPU firmware stored in the non-volatile memory 12 (step S405). In this manner, similarly to the embodiment described above, the sub-CPU 24 can, without waiting for completion of verification of validity of the main CPU firmware, start execution of the sub-CPU firmware and cause a control target device to start preparation operation. Therefore, a situation in which completion of preparation operation of a control target device controlled by the sub-CPU 24 is delayed due to an alteration detection function when the MFP 100 is activated can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-169975, filed on Sep. 11, 2018, which is hereby incorporated by reference herein in its entirety.

What is claimed is:

1. An information processing apparatus comprising:
a first processor;
a second processor;
a printer configured to print an image on a sheet;
an image processing circuit configured to perform negotiation with the printer;
a storage controller configured to control a non-volatile storage; and
one or more non-volatile memories which store a first control program and an activation program to be executed by the first processor, and a second control program to be executed by the second processor,
wherein the first processor verifies the second control program stored in the one or more non-volatile memories, which is a program for controlling the image processing circuit that communicates with the printer via a communication line for the negotiation, and verifies the activation program stored in the one or more non-volatile memories, which is a program for activating the second processor by transferring the verified second control program to a volatile memory associated with the second processor and releasing a reset status of the second processor, and
wherein after completing verification of the second control program and the activation program, the first processor verifies the first control program stored in the one or more non-volatile memories, which is a program for executing initialization of the storage controller.

2. The information processing apparatus according to claim 1, wherein
if power is supplied to the first processor, the first processor starts verification of the second control program stored in the one or more non-volatile memories.

3. The information processing apparatus according to claim 1, wherein
if the first processor confirms that the second control program and the activation program are valid, the first processor executes the activation program, and if the first processor confirms that the first control program is valid, the first processor starts execution of the first control program.

4. The information processing apparatus according to claim 1, wherein
if the second processor is activated by the first processor, the second processor starts execution of the second control program to cause a control target device to start preparation operation.

5. The information processing apparatus according to claim 1, wherein
the first processor executes the activation program, to thereby read the second control program from the one or more non-volatile memories and transfer the read second control program to a memory associated with the second processor, and release a reset status of the second processor.

6. The information processing apparatus according to claim 5, wherein
if the reset status of the second processor is released by the first processor, the second processor starts execution of the second control program stored in the memory.

7. The information processing apparatus according to claim 1, wherein
regarding each of the first control program, the second control program, and the activation program stored in the one or more non-volatile memories, if the first processor confirms that the respective program is not valid, the first processor gives notification about detection of alteration in a program.

8. The information processing apparatus according to claim 1, wherein
each of the first control program, the second control program, and the activation program stored in the one or more non-volatile memories is provided with electronic signature information used to verify a program.

9. The information processing apparatus according to claim 1, wherein the one or more non-volatile memories further store an OS (Operating System), and the first processor further verifies the OS stored in the one or more non-volatile memories before verification of the second control program.

10. A method for controlling an information processing apparatus comprising: a first processor; a second processor; a printer configured to print an image on a sheet; an image processing circuit configured to perform negotiation with the printer; a storage controller configured to control a non-volatile storage; and one or more non-volatile memories which store a first control program and an activation program to be executed by the first processor, and a second control program to be executed by the second processor, the method comprising:

the first processor verifying the second control program stored in the one or more non-volatile memories, which is a program for controlling the image processing circuit that communicates with the printer via a communication line for the negotiation, and verifying the activation program stored in the one or more non-volatile memories, which is a program for activating the second processor by transferring the verified second control program to a volatile memory associated with the second processor and releasing a reset status of the second processor, and after completing verification of the second control program and the activation program, the first processor verifying the first control program stored in the one or more non-volatile memories, which is a program for executing initialization of the storage controller.

11. A non-transitory computer-readable storage medium storing a computer program for causing a computer to execute a method for controlling an information processing apparatus comprising: a first processor; a second processor; a printer configured to print an image on a sheet; an image processing circuit configured to perform negotiation with the printer; a storage controller configured to control a non-volatile storage; and one or more non-volatile memories which store a first control program and an activation program to be executed by the first processor, and a second control program to be executed by the second processor, the method comprising:

the first processor verifying the second control program stored in the one or more non-volatile memories, which is a program for controlling the image processing circuit that communicates with the printer via a communication line for the negotiation, and verifying the activation program stored in the one or more non-volatile memories, which is a program for activating the second processor by transferring the verified second control program to a volatile memory associated with the second processor and releasing a reset status of the second processor, and after completing verification of the second control program and the activation program, the first processor verifying the first control program stored in the one or more non-volatile memories, which is a program for executing initialization of the storage controller.

* * * * *